United States Patent Office 3,788,810
Patented Jan. 29, 1974

3,788,810
PROCESS FOR THE DYEING OF SYNTHETIC FIBRE MATERIALS WITH QUINOPHTHALONE DYESTUFFS FROM ORGANIC SOLVENTS
Dietmar Kalz, Cologne, Gerhard Wolfrum, Opladen, and Rütger Neeff, Leverkusen, Germany, assignors to Bayer Aktiengesellschaft, Leverkusen, Germany
No Drawing. Filed July 16, 1971, Ser. No. 163,414
Claims priority, application Germany, July 18, 1970,
P 20 35 728.2
Int. Cl. D06p *3/26, 3/42, 3/48, 3/54, 3/72*
U.S. Cl. 8—162 R                            8 Claims

ABSTRACT OF THE DISCLOSURE

Exhaust process for the dyeing of synthetic fibre materials from organic water-immiscible solvents wherein are used as dyestuffs quinophthalone dyestuffs of the formula

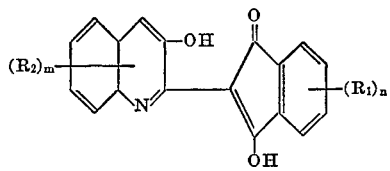

in which $R_1$ denotes a halogen atom, an alkyl, alkoxy, nitro, amino, acylamino, alkylamino, carboxylic acid ester or aryl radical and $R_2$ denotes a halogen atom, an alkyl, alkoxy, nitro or acylamino group, or in which two adjacent substituents $R_2$ stand for the residual members of a fused aromatic ring; and $n$ and $m$ represent integers from 0 to 4.

The invention relates to an exhaust process for the dyeing of synthetic fibre materials from organic water-immiscible solvents, more particularly it concerns an exhaust process for the dyeing of synthetic fibre materials from organic water-immiscible solvents wherein quinophthalone dyestuffs are used for dyeing.

Organic water-immiscible solvents suitable for the process according to the invention are those the boiling point of which lies between 40 and 170° C., for example, aromatic hydrocarbons such as toluene, xylene, and halogenated hydrocarbons, particularly aliphatic chlorinated hydrocarbons, such as methylene chloride, chloroform, carbon tetrachloride, 1,1-dichloroethane, 1,2-dichloroethane, 1,1,2-trichloroethane, 1,1,1,2-tetrachloroethane, 1,1,2,2-tetrachloroethane, pentachloroethane, 1-chloropropane, 2-chloropropane, 1,2-dichloropropane, 1,1,1-trichloropropane, 1-chlorobutane, 2-chlorobutane, 1,4-dichlorobutane, 1-chloro-2-methylpropane, 2-chloro-2-methylpropane or dichlorohexane; as well as aliphatic fluorinated and fluoro-chlorinated hydrocarbons, such as perfluoro-n-hexane, 1,2,2-trifluoro-trichloroethane and trifluoropentachloropropane; aromatic chlorinated and fluorinated hydrocarbons, such as chlorobenzene, fluorobenzene, chlorotoluene and benzotrifluoride. Tetrachloroethylene, trichloroethylene, 1,1,1-trichloroethane and 1,1,1-trichloropropane have proved particularly satisfactory. Mixtures of these solvents can also be used.

The dyestuffs to be used according to the invention are quinophthalone dyestuffs of the general formula I

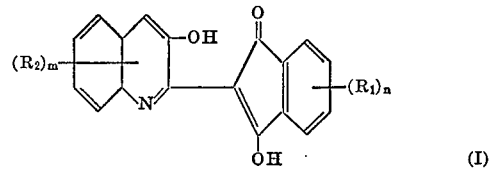

in which $R_1$ denotes a halogen atom, an alkyl, alkoxy, nitro, amino, acylamino, alkylamino, carboxylic acid ester or aryl radical and $R_2$ denotes a halogen atom, an alkyl, alkoxy, nitro or acylamino group, or in which two adjacent substituents $R_2$ stand for the residual members of a fused aromatic ring; and $n$ and $m$ represent integers from 0 to 4.

The alkyl and alkoxy groups may contain further substituents.

The dyestuffs of the Formula I can be prepared in known manner by condensation of, for example, 3-hydroxyquinaldine or its derivatives of the formula

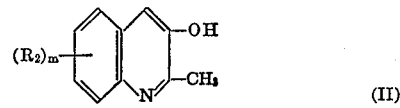

with aromatic dicarboxylic acid anhydrides of the formula

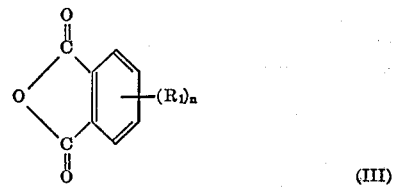

$R_1$, $R_2$, $m$ and $n$ having the same meaning as above, in high-boiling organic solvents with the elimination of water.

The following compounds may be mentioned as examples of suitable quinophthalone dyestuffs:

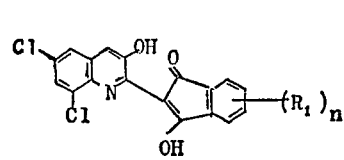
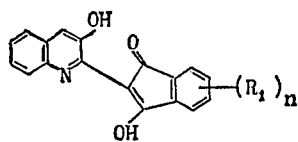
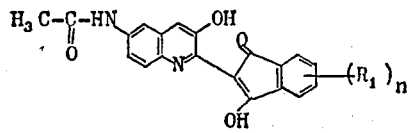
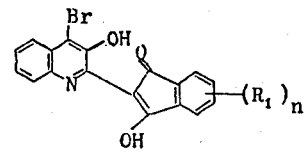

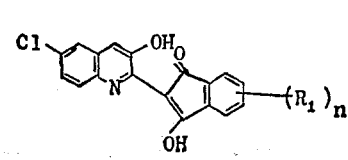
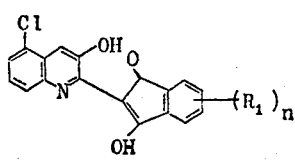
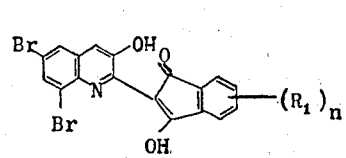

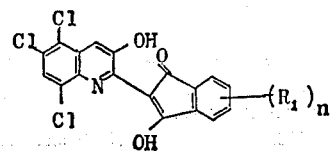
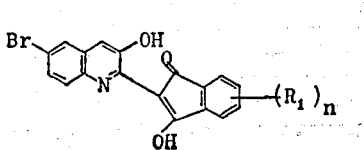

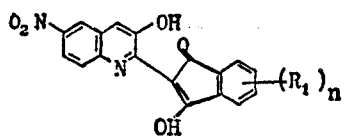 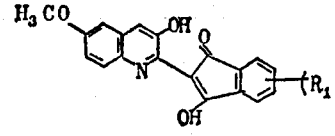 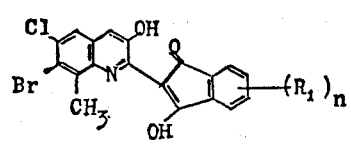

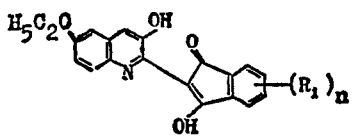 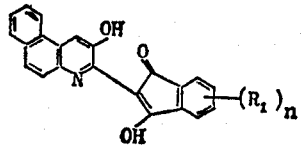 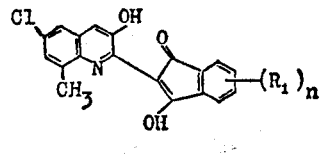

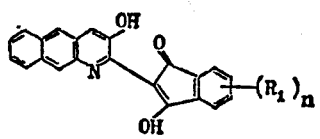 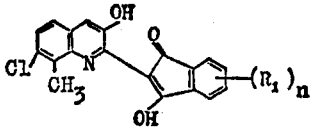 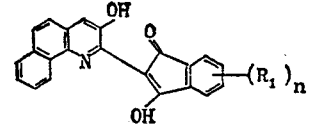

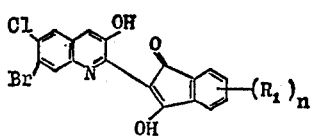

Therein $n$ denotes an integer from 0 to 4, preferably the numbers 0 or 1; and $R_1$ means a halogen atom such as fluorine, chlorine or bromine, an alkyl group such as methyl or ethyl, an alkoxy group such as methoxy or ethoxy, a nitro group, an amino group, an acylamino group, acyl being a formyl, alkyl-carbonyl, cycloalkyl-carbonyl, aryl-carbonyl, aralkyl-carbonyl, alkyl-sulphonyl, arylsulphonyl, amino-carbonyl, alkoxy-carbonyl, aralkoxy-carbonyl, aryloxy-carbonyl or heteroaryl-carbonyl group. Suitable alkyl radicals are primarily those with 1–4 carbon atoms, such as methyl, ethyl or butyl radicals which may contain further substituents, for example, alkoxy groups, such as methoxy, ethoxy or butoxy groups.

Suitable cycloalkyl radicals are, for example cyclohexyl radicals.

Suitable aryl radicals are primarily phenyl radicals with substituents such as F, Cl, Br or I, nitro groups, alkyl groups with 1–4 carbon atoms, alkoxy groups with 1–4 carbon atoms; as well as carbalkoxy groups, especially those with 1–4 carbon atoms in the alkoxy radical, for example, methoxy-carbonyl or butoxy-carbonyl groups.

Suitable heteroaryl radicals are, for example, pyridine radicals.

Furthermore, $R_1$ may have the meaning of an alkylamino group, for example, a 3-chloro-2-hydroxypropylamino group in which the chlorine may be replaced, for example, by an amino, monomethylamino, monoethylamino, dimethylamino, diethylamino, β-hydroxyethylamino, p-hydroxyethylamino, β-cyanoethylamino, di-β-cyanoethylamino, β-hydroxyethyl-β-cyanoethylamino, β-sulphonylmethyl-ethylamino group.

In addition, $R_1$ may also have the meaning of a carboxylic acid ester group, suitable alcohol components being, for example, methanol, ethanol, propanol, isopropanol, ethylene glycol, diethylene glycol, triethylene glycol, glycol monomethyl ether, glycol monoethyl ether, diethylene glycol monomethyl ether or phenol. Finally, $R_1$ may also represent a phenyl radical.

It has proved advantageous in many cases for the dyebaths to contain small amounts, i.e. up to 1 percent by weight, preferably up to 0.5 percent by weight, of water, referred to the weight of the organic solvents.

Furthermore, it has proved expedient in many cases to add non-ionic auxiliaries to the dyebaths. Suitable non-ionic auxiliaries are primarily the known interface-active ethoxylation and propoxylation products of fatty alcohols, alkylphenols, fatty acid amides and fatty acids, as well as mixtures thereof; the auxiliaries are added in an amount of 0.05–2 percent by weight, referred to the weight of the organic solvents. Instead of being immediately added to the dyebaths, the auxiliaries may be used with advantage for pasting the dyestuffs and thus be added to the dyebaths in the form of a dyestuff/auxiliary paste.

The synthetic fibre materials to be dyed according to the invention are primarily fibre materials of polyesters, such as polyethylene terephthalate, poly-cyclohexane-dimethylene-terephthalic acid and ethylene glycol; or copolyether ester fibres from p-hydroxybenzoic acid, terephthalic acid and ethylene glycol; cellulose triacetic, cellulose 2½-acetate; polyacrylonitrile, synthetic polyamides, such as hexamethylene-diamine adipate, poly-ε-caprolactam or ω-aminoundecanic acid; and polyurethanes. The fibre materials may be present in various stages of processing, for example, as threads, loose material, combed material, yarn, as piece goods, such as fabrics or knitted fabrics, or as ready-made goods.

Dyeing according to the invention is preferably carried out in closed apparatus, for example, by introducing the fibre materials into the dyebath at room temperature; heating the dyebath to 60–170° C., and maintaining the same temperature until the bath is exhausted; this is usually the case after 10–60 minutes. After cooling to room temperature, the liquor is separated, and the fibre materials, optionally after a brief rinsing with fresh organic solvent, are freed from the adhering solvent by filtering off with suction or centrifuging and subsequent drying in a hot air current. With the aid of the process according to the invention it is possible to dye synthetic fibre materials from organic solvents in a simple way, high dyestuff yields and excellent fastness properties being achieved.

The quinophthalone dyestuffs to be used according to the invention are very sparingly soluble in the organic water-immiscible solvents. They are distinguished from the dyestuffs hitherto used for dyeing synthetic fibre materials from organic solvents by a substantially better affinity and an increased fastness to sublimation.

It may be mentioned that mixtures of the dyestuffs to be used according to the invention sometimes give a better dyestuff yield than the individual dyestuffs.

The parts given in the following examples are parts by weight.

EXAMPLE 1

100 parts of a fabric of textured polyethylene terephthalate fibres are introduced, without previous cleaning, at room temperature into a dyebath prepared from 1 part 4'-bromoquinophthalone of the formula

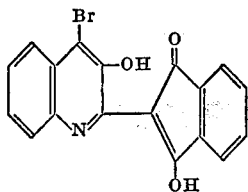

and
1000 parts tetrachloroethylene.

The bath is heated to 115° C. within 10 minutes and kept at the same temperature for 30 minutes while the liquor is vividly circulating. The liquor is then separated, and the dyed material is rinsed with fresh solvent at about 40° C. for 5 minutes. After separation of the rinsing liquor, the dyed material is centrifuged and dried in an air current. A strong yellow dyeing of excellent fastness to sublimation and very good fastness to washing and light is obtained.

An equally satisfactory dyeing was obtained in the same way on a fabric of polycyclohexane-dimethylene terephthalate fibres.

Yellow dyeings of equally satisfactory fastness properties were also obtained when the dyestuff mentioned above was replaced with the same amount of one of the following quinophthalone dyestuffs.

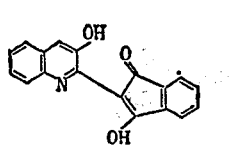
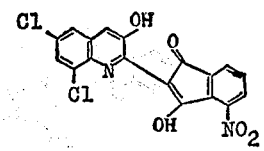
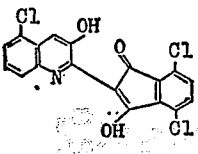
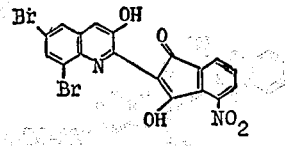

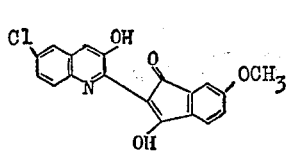
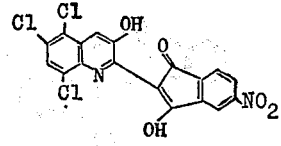
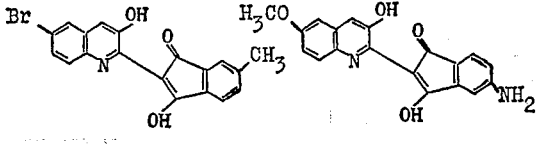

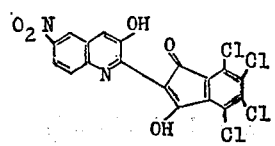
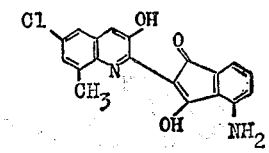
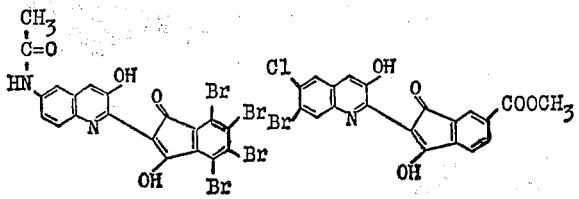

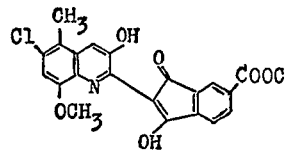
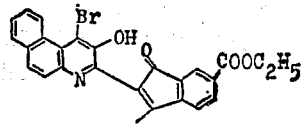
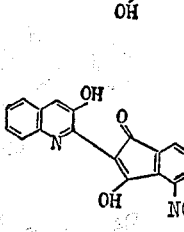

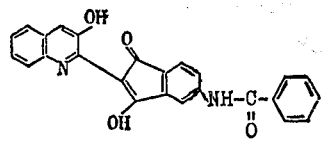
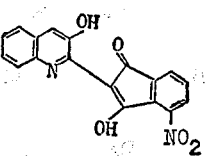
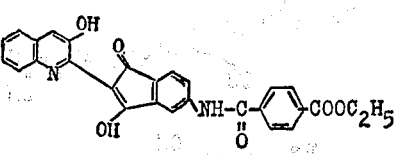

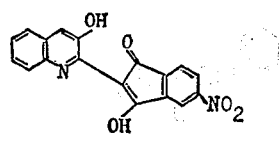
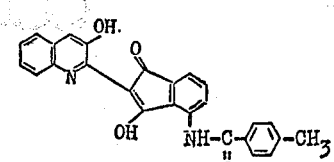
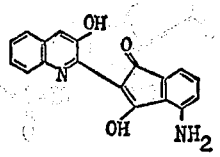

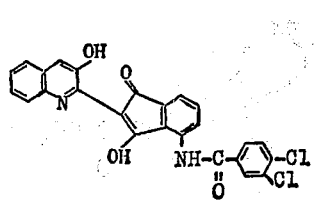
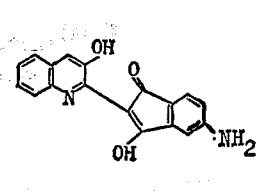
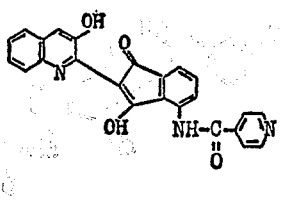

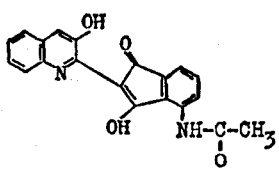
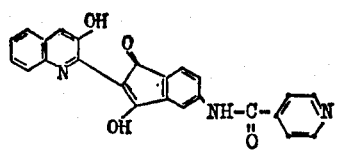
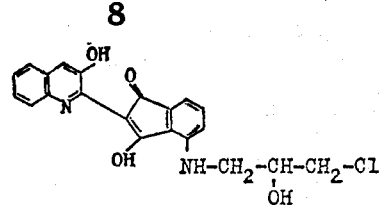
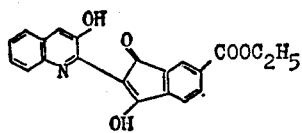
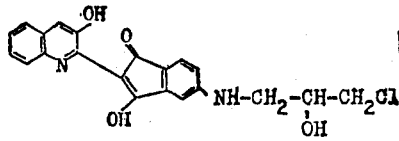
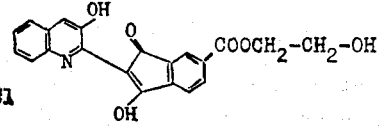
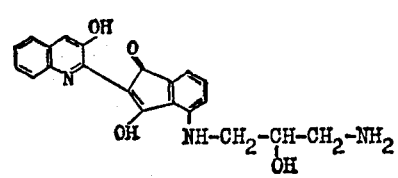
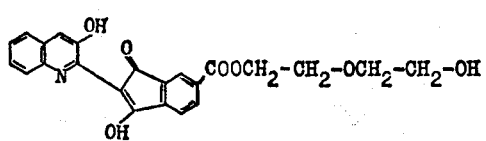
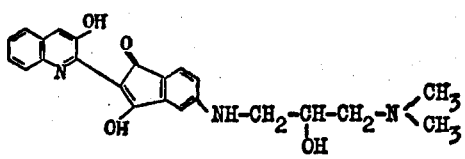
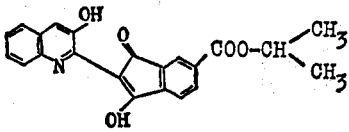
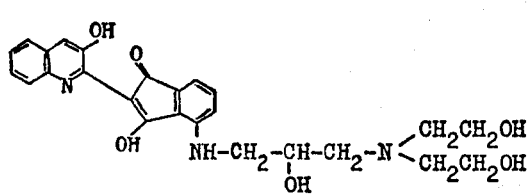
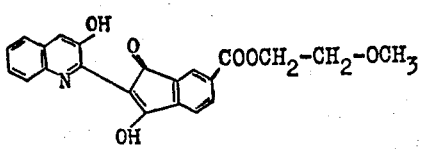
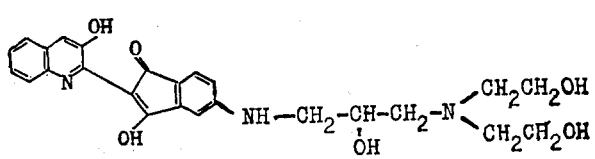
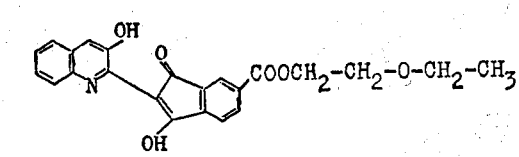
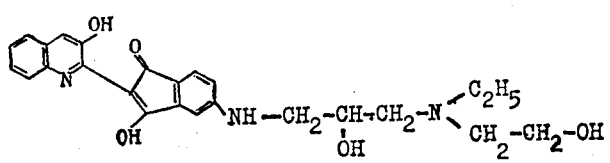
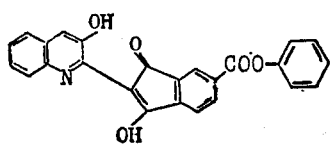
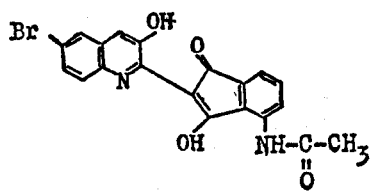
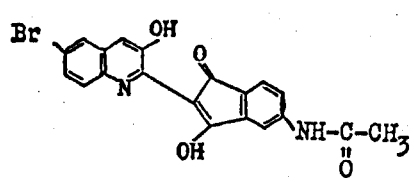
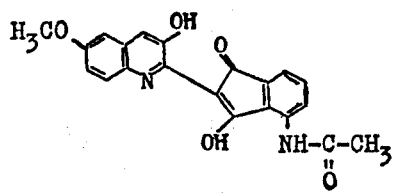
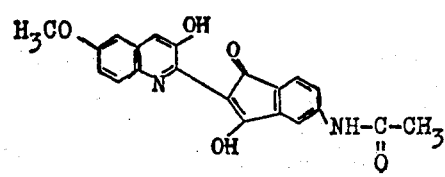

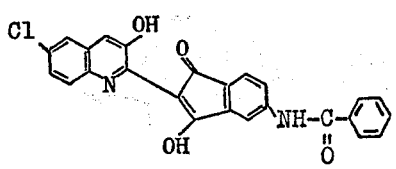

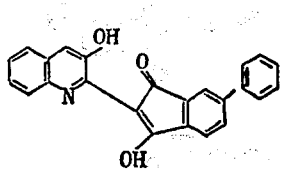

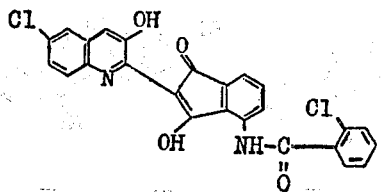

EXAMPLE 2

100 parts of a fabric of triacetate fibres are introduced at room temperature into a dyebath prepared from 1 part of the quinophthalone dyestuff of the formula

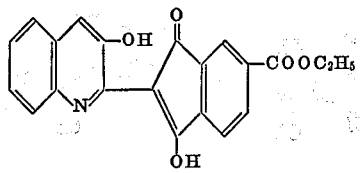

and
1000 parts tetrachloroethylene.

The bath is heated to 110° C. within 20 minutes and kept at the same temperature for 45 minutes while the liquor is vividly circulating. The liquor is then separated and the fabric is rinsed with fresh tetrachloroethylene at 40° C. After separation of the rinsing liquor, the dyed material is freed from the adhering solvent by centrifuging and drying in an air current. A full brilliant yellow dyeing of excellent fastness properties is obtained.

EXAMPLE 3

100 parts of yarn of polyacrylonitrile fibres is dyed in a bath prepared from 1 part of the quinophthalone dyestuff of the formula

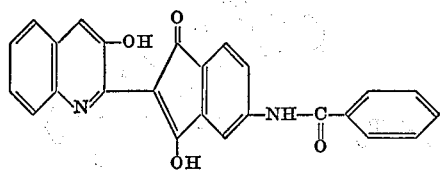

and
1000 parts tetrachloroethylene.

The bath is heated to 100° C. within 20 minutes and kept at the same temperature for 30 minutes. After the usual washing and drying, a yellow dyeing of very good fastness properties is obtained.

EXAMPLE 4

100 parts of a fabric of polyester fibres are introduced at room temperature into a dyebath prepared from 1 part of a mixture of equal parts of the two quinophthalone dyestuffs

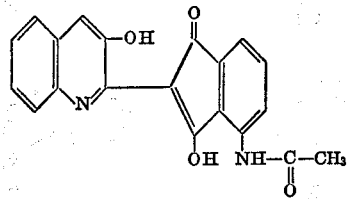

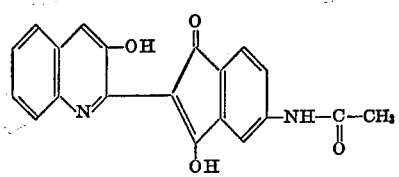

1.5 parts oleic acid ethanolamide
1.5 parts oleyl alcohol eicosaethylene glycol ether
6 parts of water and
1000 parts tetrachloroethylene.

The bath is heated to 120° C. within 10 minutes and kept at the same temperature for 45 minutes while the liquor is vividly circulating. After separation of the dye liquor, the dyed material is rinsed with fresh solvent at 40° C. and dried in an air current after removal of the rinsing liquor. A deep yellow dyeing of excellent fastness to light and sublimation is obtained.

The dyeing with the addition of oleic acid ethanolamide, oleyl alcohol eicosaethylene glycol ether and water as described above has a strength of color about 10% higher than a dyeing without these additives. When the 500 parts tetrachloroethylene are replaced with the same amount of 1,1,2-trichloroethane, 1,1,1,2-tetrachloroethane, 1,1,2,2-tetrachloroethane, pentachloroethane, 1,2-dichloropropane, 2-chlorobutane, 1,4-dichlorobutane, perfluoro-n-hexane, 1,2,2-trifluoro-trichloroethane, trifluoro-pentachloropropane, chlorobenzene, fluorobenzene, chlorotoluene or benzotrifluoride, then equally satisfactory yellow dyeings are obtained.

Yellow dyeings of very good fastness to sublimation, rubbing and light and very good fastness to washing and solvents are also obtained when the following quinophthalone dyestuffs are used for dyeing in the manner described above.

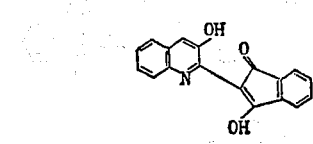 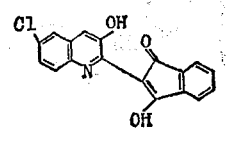 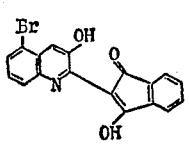 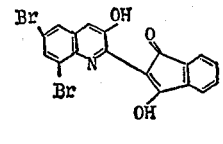

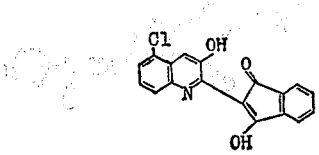 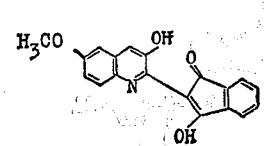 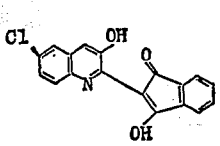 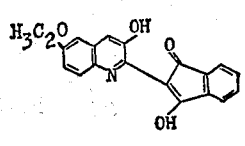

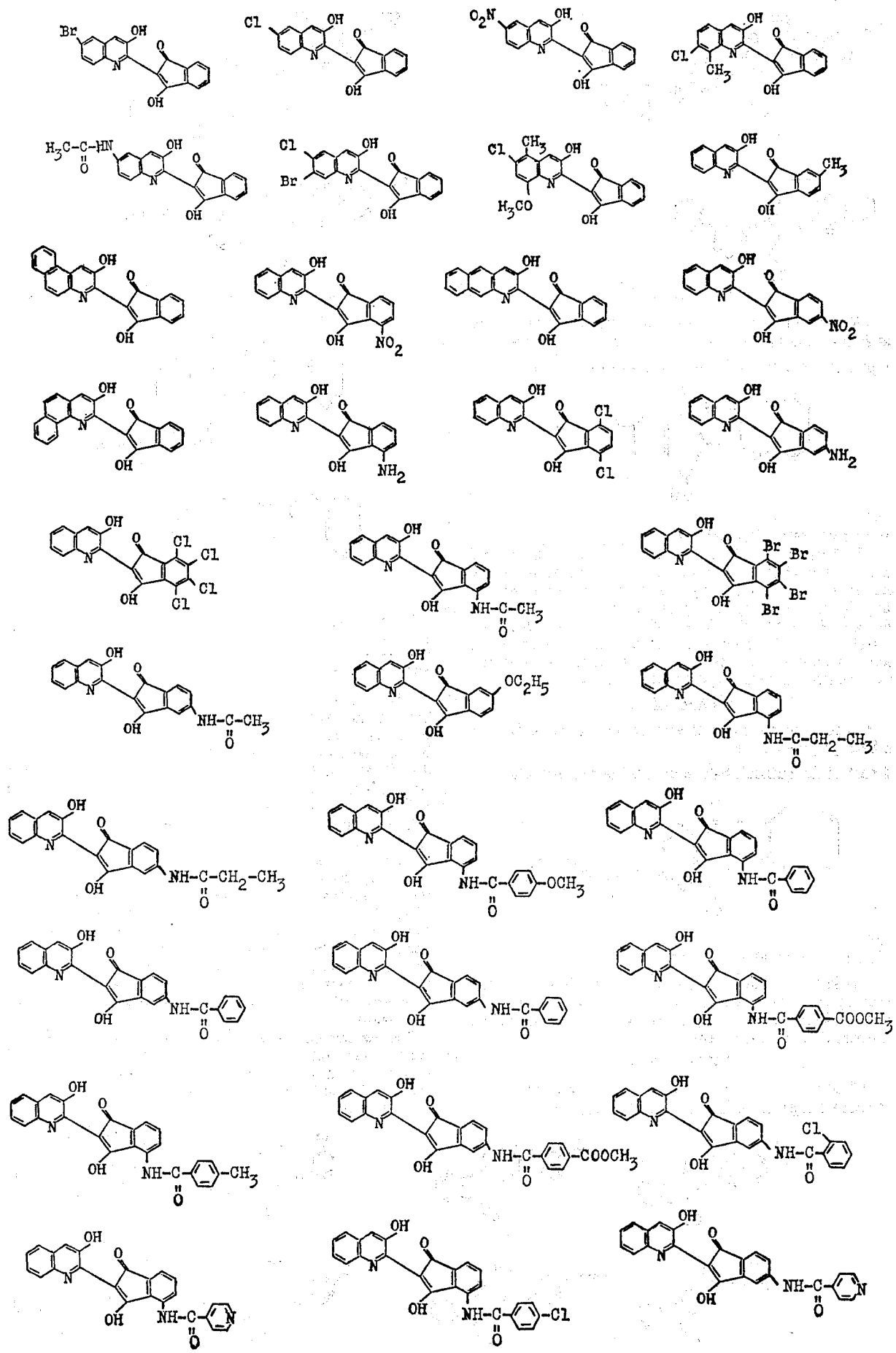

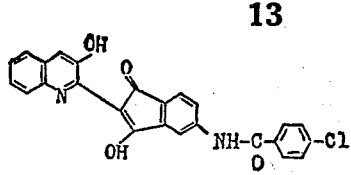
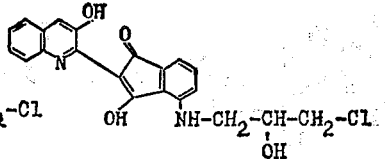
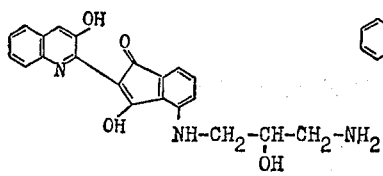
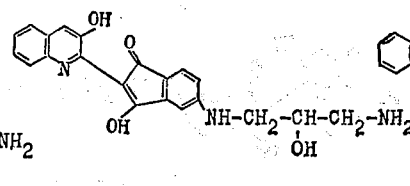
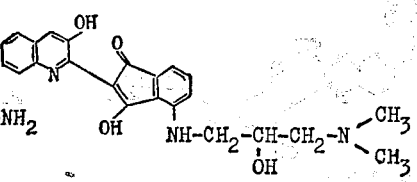
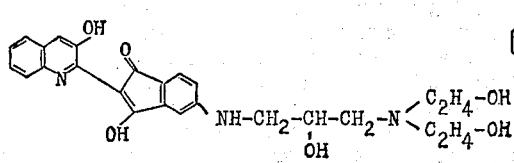
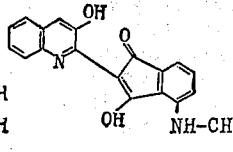
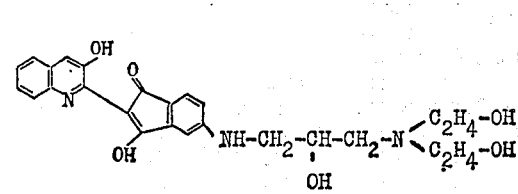
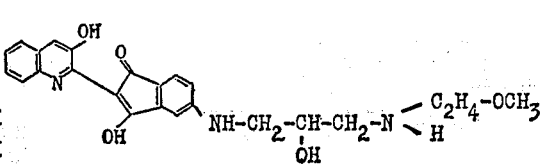
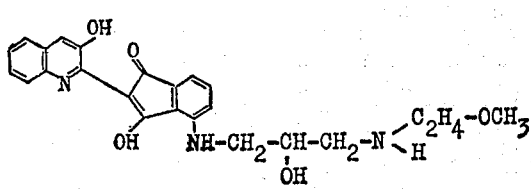
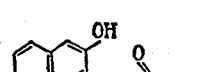
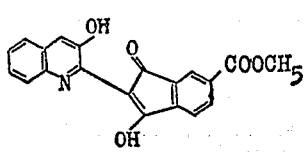
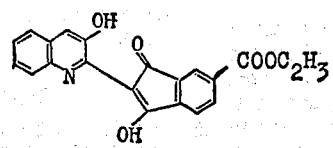
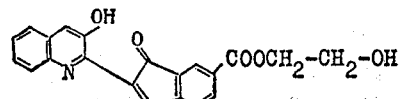
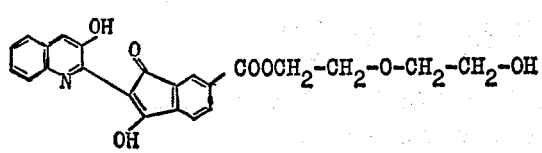
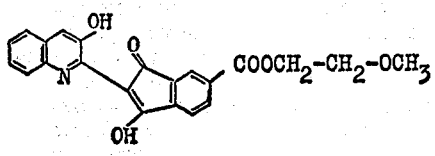
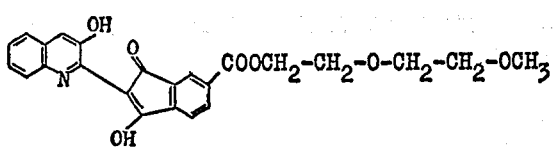
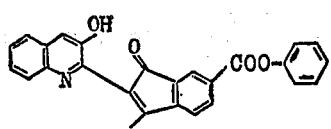
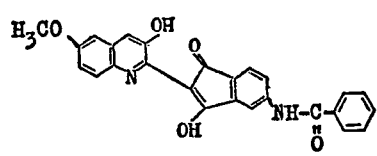
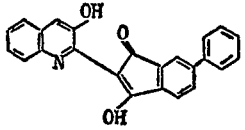
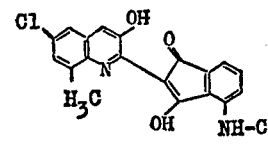
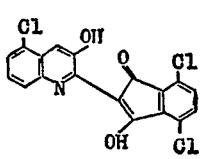
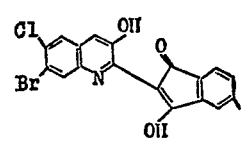
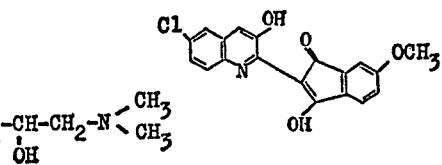

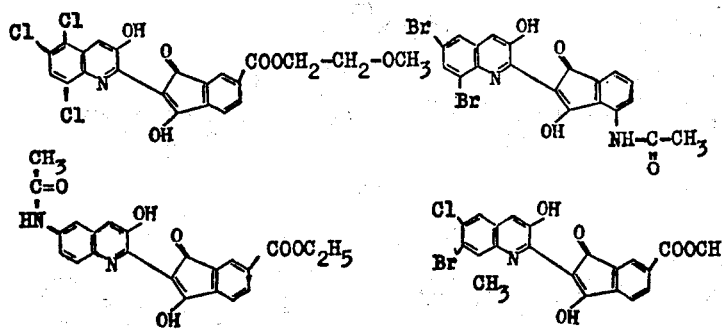
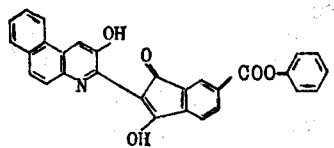
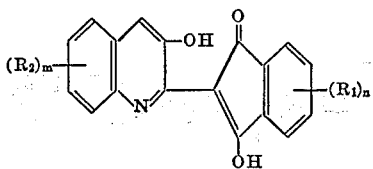

We claim:
1. Process for dyeing synthetic fiber materials by exhaustion comprising introducing synthetic fiber material into a dyebath consisting essentially of organic solvent and a quinophthalone dyestuff; said organic solvent consisting of aliphatic halogenated hydrocarbon and said quinophthalone dyestuff being very sparingly soluble in said dyebath and having the formula

$$\text{(R}_2\text{)}_m \text{—} \underset{\text{N}}{\overset{\text{OH}}{\bigcirc}} \text{—} \underset{\text{OH}}{\overset{\text{O}}{\bigcirc}} \text{—(R}_1\text{)}_n$$

in which $R_1$ is halogen, alkyl, alkoxy, nitro, amino, acylamino, alkylamino, carboxylic ester or aryl;
$R_2$ is halogen, alkyl, alkoxy, nitro or acylamino, or the members of a fused aromatic ring; and
$n$ and $m$ are integers from 0 to 4;

and dyeing at a temperature of 60° to 170° C. until the dyebath is exhausted.

2. Process of claim 1 in which
$R_1$ is halogen; methyl; ethyl; methoxy; ethoxy; nitro; amino; alkylamino; substituted alkylamino in which the alkyl group is substituted with hydroxy, chlorine, amino, monomethylamino, monoethylamino, dimethylamino, diethylamino, $\beta$-hydroxyethylamino, p-hydroxyethylamino, $\beta$-cyanoethylamino, di-$\beta$-cyanoethylamino, $\beta$-hydroxyethyl - $\beta$ - cyanoethylamino, or $\beta$-sulphonylmethyl-ethylamino; acylamino in which acyl is formyl, alkyl-carbonyl, cyclohexylcarbonyl, aryl-carbonyl, aralkyl-carbonyl, alkylsulphonyl, arylsulphonyl, aminocarbonyl, alkoxy-carbonyl, aralkoxy-carbonyl, aryloxy-carbonyl or pyridyl-carbonyl; carbalkoxy with 1–4 carbon atoms in the alkoxy radical; or aryl; in which said alkyl radicals are those with 1–4 carbon atoms, and said aryl is phenyl or phenyl substituted with F, Cl, Br, I, nitro, $C_1$–$C_4$-alkyl or $C_1$–$C_4$-alkoxy;
$R_2$ is halogen, alkyl, alkoxy, nitro or acylamino, or the members of a fused aromatic ring.

3. The process of claim 1 in which
$R_1$ is halogen; nitro; amino; acylamino in which acyl is formyl, alkyl-carbonyl, cyclohexyl-carbonyl, aryl-carbonyl, aralkyl-carbonyl, alkylsulphonyl, arylsulphonyl, amino-carbonyl, alkoxy-carbonyl, aralkoxy-carbonyl, aryloxy-carbonyl or pridyl-carbonyl; in which said alkyl radicals are those with 1–4 carbon atoms, and said aryl radicals are phenyl or phenyl substituted with F, Cl, Br, I, nitro, $C_1$–$C_4$-alkyl, or $C_1$–$C_4$-alkoxy; or carbalkoxy with 1–4 carbon atoms in the alkoxy radical;
$R_2$ is halogen; and
$n$ is an integer from 0 to 1.

4. The process of claim 1 in which said synthetic fiber material is polyester, polyamide, cellulose triacetate, cellulose 2½ acetate, polyacrylonitrile, or polyurethane.

5. The process of claim 1 in which said synthetic fiber material is polyester.

6. The process of claim 1 in which said aliphatic halogenated hydrocarbon is tetrachloroethylene, trichloroethylene, 1,1,1-trichloroethane, or 1,1,1-trichloropropane.

7. The process of claim 1 in which said dyebath contains up to 1% by weight of water based on the weight of the aliphatic halogenated hydrocarbon.

8. The process of claim 1 in which said dyebath contains 0.05 to 2% by weight of non-ionic dyeing auxiliary based on the weight of said aliphatic halogenated hydrocarbon.

References Cited

UNITED STATES PATENTS

| 3,473,175 | 10/1969 | Sieber | 8—158 |
| 3,510,243 | 5/1970 | Seuret et al. | 8—39 |

FOREIGN PATENTS

| 832,343 | 1/1970 | Canada. |
| 1,581,325 | 9/1969 | France. |

GEORGE F. LESMES, Primary Examiner

P. C. IVES, Assistant Examiner

U.S. Cl. X.R.

8—166, 177 R, 178 R, 174, 179; 260—287, R, 288 R, 289 QP